United States Patent
Krishnamurthy et al.

(10) Patent No.: US 9,542,272 B2
(45) Date of Patent: Jan. 10, 2017

(54) WRITE REDIRECTION IN REDUNDANT ARRAY OF INDEPENDENT DISKS SYSTEMS

(71) Applicant: LSI Corporation, San Jose, CA (US)

(72) Inventors: Naveen Krishnamurthy, Bangalore (IN); Sridhar Rao Veerla, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 93 days.

(21) Appl. No.: 14/223,488

(22) Filed: Mar. 24, 2014

(65) Prior Publication Data

US 2015/0269025 A1 Sep. 24, 2015

(51) Int. Cl.
*G06F 11/00* (2006.01)
*G06F 11/10* (2006.01)
*G06F 3/06* (2006.01)

(52) U.S. Cl.
CPC ........... *G06F 11/1092* (2013.01); *G06F 3/064* (2013.01); *G06F 3/0619* (2013.01); *G06F 3/0689* (2013.01); *G06F 11/1088* (2013.01)

(58) Field of Classification Search
CPC .............. G06F 11/1076; G06F 11/1008; G06F 11/2094; G11B 20/1833; H05K 999/99
USPC ....................................................... 714/6.21
See application file for complete search history.

(56) References Cited

U.S. PATENT DOCUMENTS

| | | | |
|---|---|---|---|
| 6,154,853 A * | 11/2000 | Kedem | ............... G06F 11/1084 711/114 |
| 7,024,586 B2 | 4/2006 | Kleiman | |
| 7,281,089 B2 * | 10/2007 | Thompson | ............ G06F 3/0605 711/112 |
| 7,389,396 B1 * | 6/2008 | Goel | .................... G06F 11/0727 711/112 |
| 7,711,897 B1 * | 5/2010 | Chatterjee | ............. G06F 3/0605 711/112 |
| 7,840,838 B2 | 11/2010 | Stewart | |
| 8,402,230 B2 | 3/2013 | Bradford | |
| 8,417,989 B2 | 4/2013 | Kumar | |
| 2006/0236149 A1 * | 10/2006 | Nguyen | .............. G06F 11/1092 714/6.12 |
| 2014/0201441 A1 * | 7/2014 | Rozmovits | .......... G06F 11/2094 711/118 |

OTHER PUBLICATIONS

Seagate, "Reducing RAID Recovery Downtime," 2011. Online at http://www.seagate.com/files/staticfiles/docs/pdf/whitepaper/tp620-1-1110us-reducing-raid-recovery.pdf.

* cited by examiner

*Primary Examiner* — Bryce Bonzo
*Assistant Examiner* — Katherine Lin

(57) ABSTRACT

Methods and structure for redirecting writes in Redundant Array of Independent Disks (RAID) systems are provided. One exemplary embodiment is a RAID controller that includes a memory and a control unit. The memory is able to store mapping information that correlates Logical Block Addresses of a RAID volume with physical addresses of storage devices. The control unit is able to generate a request to write volume data to at least one of the physical addresses, to determine that a storage device has failed to complete the request, to alter the mapping information by correlating Logical Block Addresses for the request with physical addresses of a spare storage device, to redirect the request to the spare storage device, and to rebuild remaining Logical Block Addresses that are correlated with the storage device that failed.

20 Claims, 9 Drawing Sheets

WRITE REDIRECTION IN REDUNDANT ARRAY OF INDEPENDENT DISKS SYSTEMS

FIELD OF THE INVENTION

The invention relates to Redundant Array of Independent Disks (RAID) storage systems.

BACKGROUND

In storage systems, data for a logical RAID volume is often striped across multiple storage devices to enhance data access speed and/or redundancy. Storage systems use parity information to provide redundancy for RAID volume data. Thus, if a storage device for the RAID volume fails, the parity information kept on other storage devices may be used to rebuild the lost data. In many storage systems that maintain RAID volumes, each time a stripe of volume data is written to storage, the stripe is decomposed into write requests that are each directed to a different storage device. One or more of these write requests may include parity information for the stripe. If a write request to a storage device fails, the storage device is dropped from the RAID volume. However, the corresponding parity information is still successfully written to storage (e.g., because it is directed to a different storage device). The storage system therefore uses this parity information when rebuilding RAID volume data for the dropped storage device.

SUMMARY

One exemplary embodiment is a Redundant Array of Independent Disks (RAID) controller that includes a memory and a control unit. The memory is able to store mapping information that correlates Logical Block Addresses of a Redundant Array of Independent Disks volume with physical addresses of storage devices. The control unit is able to generate a request to write volume data to at least one of the physical addresses, to determine that a storage device has failed to complete the request, to alter the mapping information by correlating Logical Block Addresses for the request with physical addresses of a spare storage device, to redirect the request to the spare storage device, and to rebuild remaining Logical Block Addresses that are correlated with the storage device that failed.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Systems and methods herein enhance the speed of rebuild processes that are performed when/after a failed write request to a storage device is detected. Specifically, these systems and methods redirect a failed write request to a spare storage device. Since the write request is redirected to a storage device that has not failed, volume data in the write request does not have to be rebuilt via processing-intensive exclusive OR (XOR) operations that are based on parity data. This in turn saves processing resources and increases speed.

Figure 1:
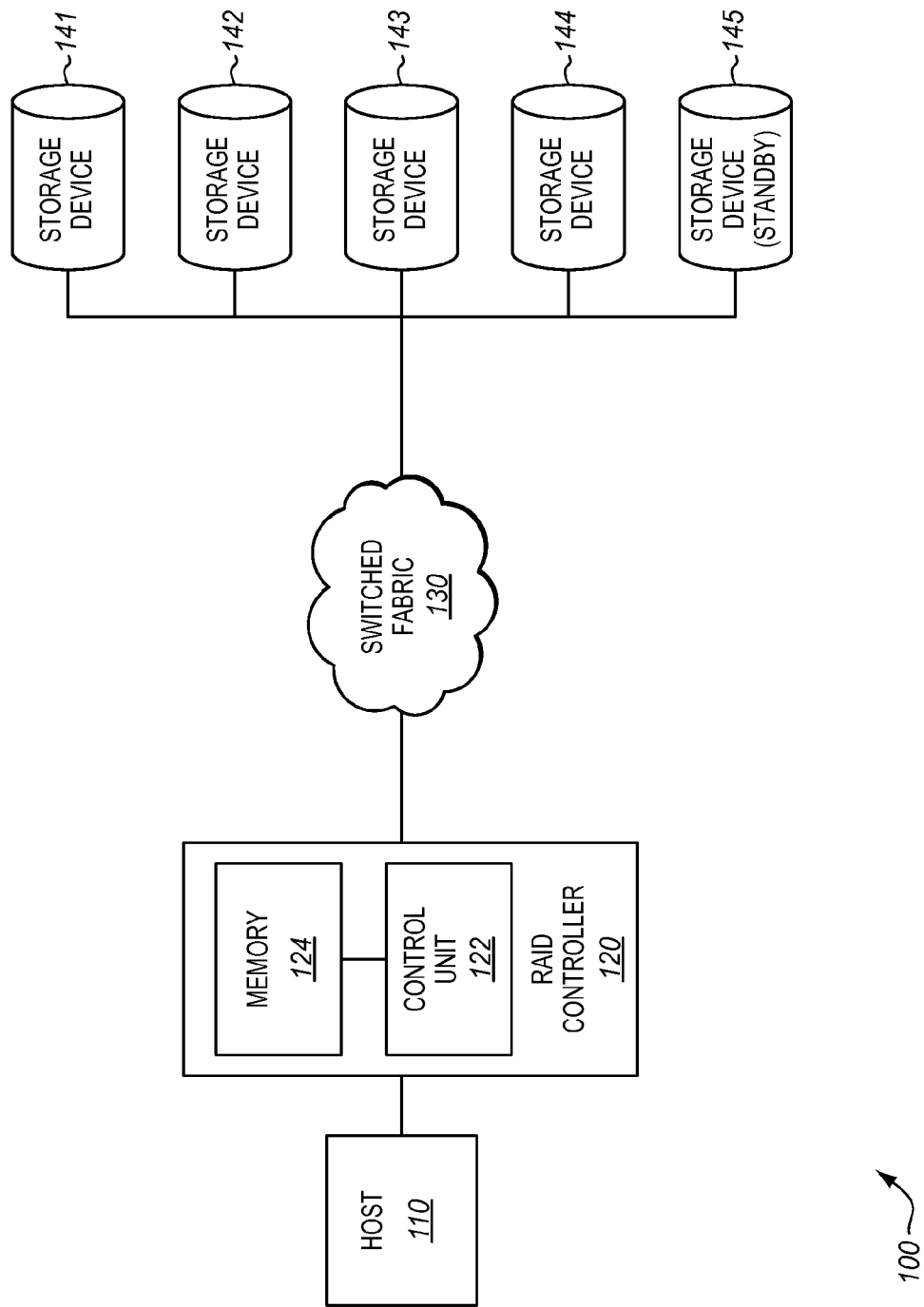
FIG. 1 is a block diagram of an exemplary RAID storage system.

FIG. 1 is a block diagram of an exemplary RAID storage system 100. In this embodiment, storage system 100 includes host 110, RAID controller 120, switched fabric 130, and storage devices 141-145.

As shown, storage system 100 utilizes multiple storage devices 141-144 to maintain data for a RAID logical volume on behalf of host 110. Host 110 (e.g., a computer, server, etc.) generates Input/Output (I/O) directed to RAID controller 120 in order to modify and/or retrieve data for the logical volume. As used herein, "host read requests" and "host write requests" (or, in general, "host I/O") are directed to one or more Logical Block Addresses (LBAs) of the volume. However, because of the striping and/or mirroring found in RAID systems, an LBA does not directly correspond with a physical address on a storage device. To address this discrepancy, RAID controller 120 receives and processes host I/O from host 110, and generates write requests directed to individual storage devices 141-144, which store data for the volume. For example, each time a request is made to write to one or more LBAs, RAID controller 120 generates corresponding write commands for storage devices 141-144. In one embodiment, RAID controller 120 also generates and transmits parity data based on each incoming host write request.

RAID controller 120 comprises memory 124 (e.g., NVRAM, flash memory, etc.) and control unit 122. Control unit 122 can be implemented as custom circuitry, a processor executing programmed instructions stored in program memory, or some combination thereof.

When RAID controller 120 determines that a write request for a storage device has failed, it is capable of redirecting the write request to another storage device (e.g., standby storage device 145). A write request failure causes RAID controller 120 to drop the failed storage device and initiate a rebuild. Redirecting the write request is therefore beneficial, because it ensures that data from the failed request does not have to be regenerated from parity data (e.g., via processing-intensive XOR operations) during the rebuild. This saves processing resources at RAID controller 120. Additionally, data redundancy is maintained for the RAID volume, because all of the data for the host write request (including the parity data) is successfully written to storage devices.

Storage system 100 utilizes switched fabric 130 to communicate with coupled storage devices 141-145. Switched fabric 130 comprises any suitable combination of communication channels operable to forward/route communications, for example, according to protocols for one or more of Small Computer System Interface (SCSI), Serial Attached SCSI (SAS), FibreChannel, Ethernet, Internet SCSI (ISCSI), etc.

Storage devices 141-145 implement the persistent storage capacity of storage system 100, and are capable of writing and/or reading data in a computer readable format. For example, storage devices 141-145 can comprise magnetic hard disks, solid state drives, optical media, etc. compliant with protocols for SAS, Serial Advanced Technology Attachment (SATA), Fibre Channel, etc. Storage devices 141-145 need not be dedicated to only one logical volume, and can store data for any number of other logical volumes. The particular arrangement, number, and configuration of storage system components described herein is exemplary and non-limiting.

Figure 2:
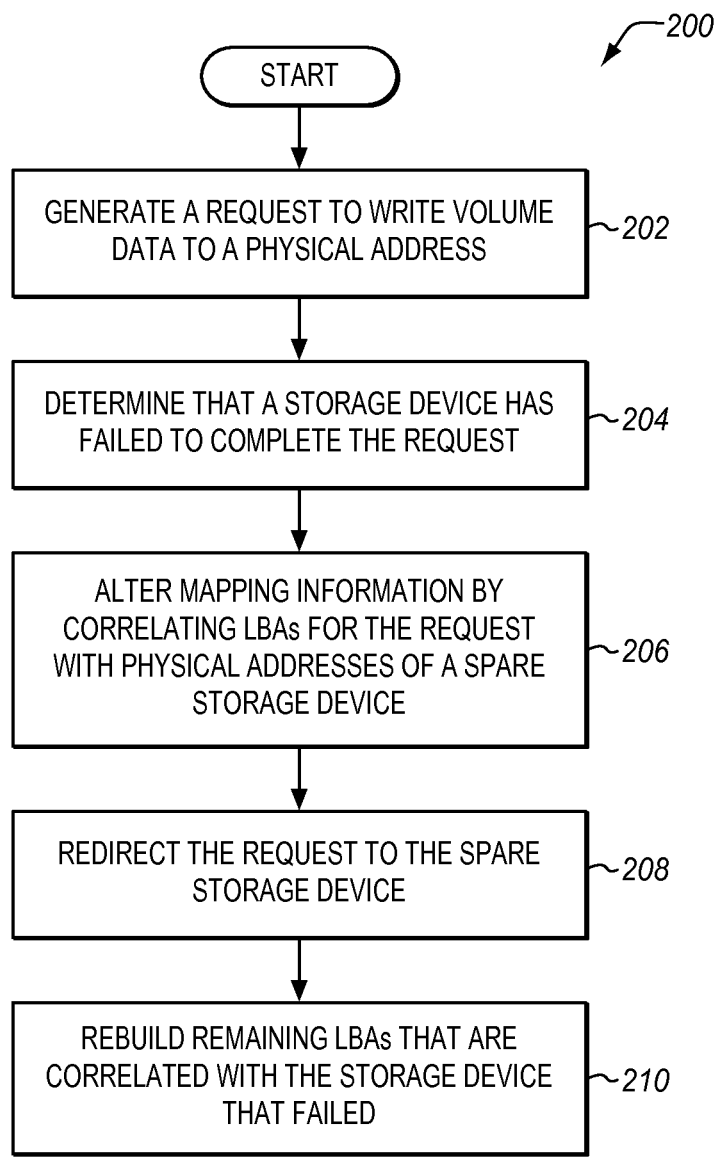
FIG. 2 is a flowchart describing an exemplary method to redirect write requests in a storage system.

FIG. 2 is a flowchart describing an exemplary method 200 to redirect write requests in a storage system. Assume, for this embodiment, that a host write request has been received at RAID controller 120, indicating that data should be written to one or more LBAs of a RAID volume. Further assume that storage device 143 has encountered a failure that prevents storage device 143 from processing incoming write requests.

In step 202, control unit 122 generates a request to write volume data to a physical address at storage device 143. Control unit 122 uses mapping information from memory 124 to correlate LBAs from the host write request with physical addresses of individual storage devices 141-144 (as used herein, a physical address of a storage device is a portion of storage media, at the storage device, capable of storing data). Thus, in one embodiment control unit 122 uses the mapping information to generate a write request for each storage device 141-144 that corresponds with the requested LBAs of the RAID volume. This mapping information can be saved to a persistent memory on RAID controller 120 or to a vendor specific area used to store Disk Data Format (DDF) information for physical storage devices 141-144, where RAID metadata is stored. The write requests generated based on the mapping information can include parity information for the requested LBAs. These write requests can then transmitted by RAID controller 120 to individual storage devices for completion.

In step 204, control unit 122 determines that storage device 143 has failed to complete the write request generated in step 202. Control unit 122 can make this determination based on status reports provided by the storage devices. For example, in one embodiment, each storage device reports to RAID controller 120 to indicate whether its corresponding write request succeeded or failed. Thus, when storage device 143 reports a failure, or fails to report at all for a period of time (e.g., times out), control unit 122 determines that storage device 143 has failed to complete the write request.

Since storage device 143 has failed, it should no longer be used to store data for the RAID volume. As such, storage device 143 will be dropped from the RAID volume and its data will be rebuilt. To enhance the speed and reliability of accounting for the failed storage device, RAID controller 120 performs steps 206-208 to redirect the failed write request to spare/standby storage device 145.

In step 206, control unit 122 alters the mapping information stored in memory 124. As a part of this process, control unit 122 correlates LBAs from the failed write request (e.g., LBAs that are presently associated with physical addresses at faulty storage device 143) with physical addresses of spare/standby storage device 145. By updating the mapping information for the RAID volume, control unit 122 ensures that future host I/O requests that are directed to these LBAs will go to standby storage device 145 (instead of faulty storage device 143). This prepares the storage system for step 208, where control unit 122 redirects/reapplies the failed write request to spare/standby storage device 145. Step 208 may further include modifying the failed write request so that it points to the appropriate physical addresses on storage device 145.

In one embodiment, once the redirected write request has been completed, control unit 122 reports successful completion of the host write request to host 110. Therefore, from the perspective of host 110, there has been no issue with writing to the logical volume.

In step 210, control unit 122 rebuilds remaining LBAs that are still correlated with failed storage device 143, which may include remapping those LBAs to a new storage device. In one embodiment, control unit 122 identifies each stripe of volume data, and utilizes XOR operations based on the parity data within each stripe to rebuild the data lost from (now inaccessible) storage device 143. The rebuild process can utilize spare/standby storage device 145 as a "hot spare" by directly rebuilding data for the remaining LBAs directly onto storage device 145, or the rebuild process may utilize any other available storage device as desired. In one embodiment, upon completion of the rebuild (or even during the rebuild), control unit 122 updates the mapping information in memory by correlating the LBAs from the rebuild process with the physical addresses of storage device 145.

In one embodiment, control unit 122 waits until it detects that failed storage device 143 has been physically removed and replaced by a new storage device. Control unit 122 then performs the rebuild processes for the remaining LBAs onto the new storage device.

As discussed above, parity-based rebuilds utilize XOR operations that read from multiple storage devices and are processing intensive. Fortunately, control unit 122 has avoided the need to rebuild data for the failed write request, because the volume data for the failed write request has already been remapped and written to standby storage device 145, without the use of XOR operations.

Even though the steps of method 200 are described with reference to storage system 100 of FIG. 1, method 200 can be performed in other systems. The steps of the flowcharts described herein are not all inclusive and can include other steps not shown. The steps described herein can also be performed in an alternative order.

In a further embodiment, method 200 is applied to nested levels of RAID (e.g., "RAID within RAID" systems), such as those implemented by Controlled Replication Under Scalable Hashing (CRUSH) systems. In such "nested" RAID systems, method 200 may be applied to any of the levels of RAID used.

In a further embodiment control unit 122 redirects multiple failed write requests for multiple failed storage devices to storage device 145. Storage device 145 maintains the redirected data, which is then transferred back/remapped to replacement storage devices as a part of the rebuild process.

EXAMPLES

In the following examples, additional processes, systems, and methods are described in the context of a storage system that redirects a write request in order to enhance rebuild processes for a RAID level 4 volume. Although described in the context of a RAID 4 volume, wherein there is a dedicated drive used for parity information, these techniques may also be applied to any RAID level as desired. For example, in a RAID level 0 system, since there is no redundancy, a drive that encounters an error will not be failed immediately. Instead, a copy operation will be used to copy the contents of the faulty drive to a new drive. While performing this operation, the data from the write request can be copied from the spare drive (where the data was remapped) to the new drive.

Figure 3:
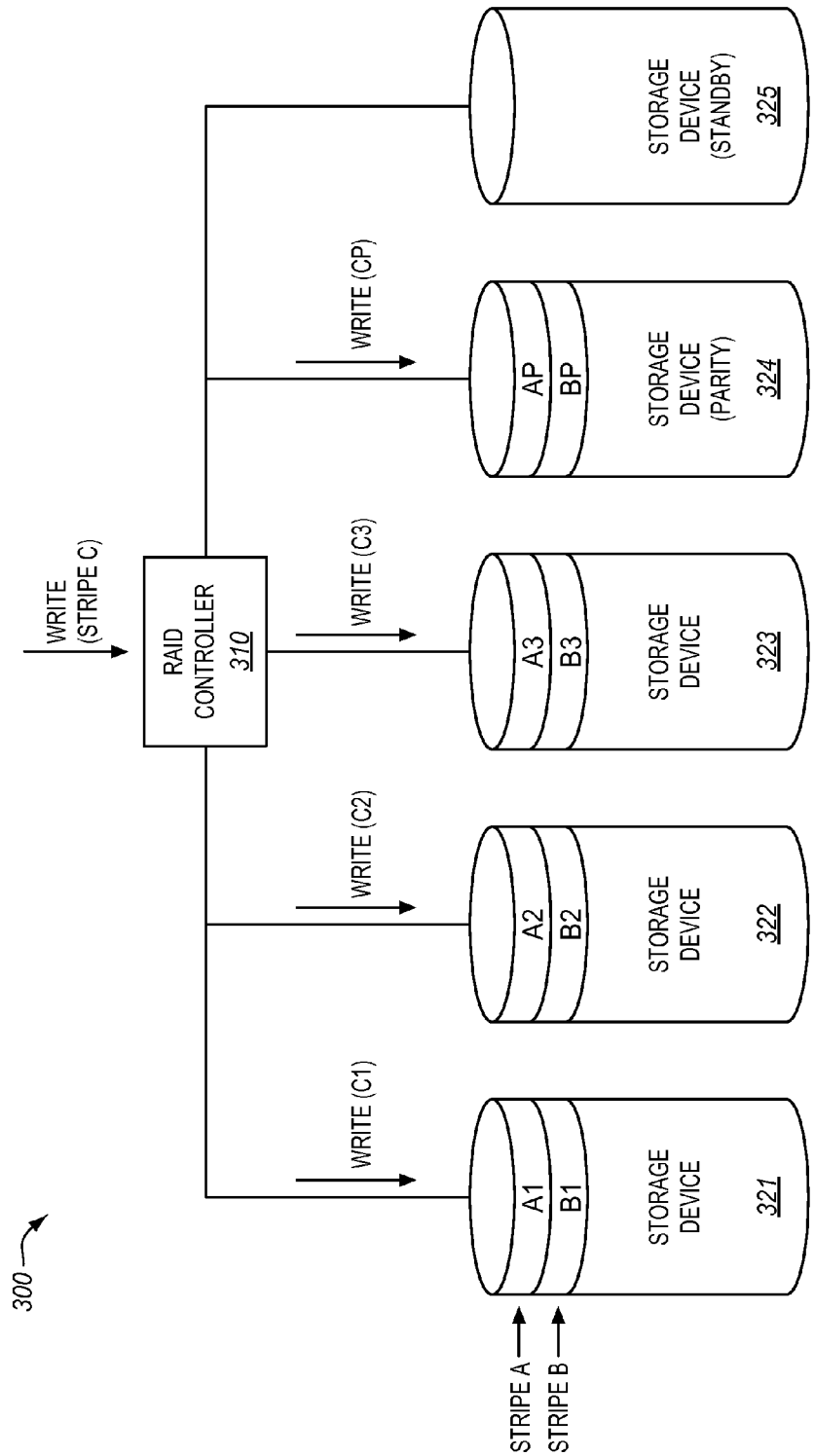
FIGS. 3-7 are block diagrams illustrating an exemplary series of operations for enhancing rebuild processes in a storage system.
Figure 4:
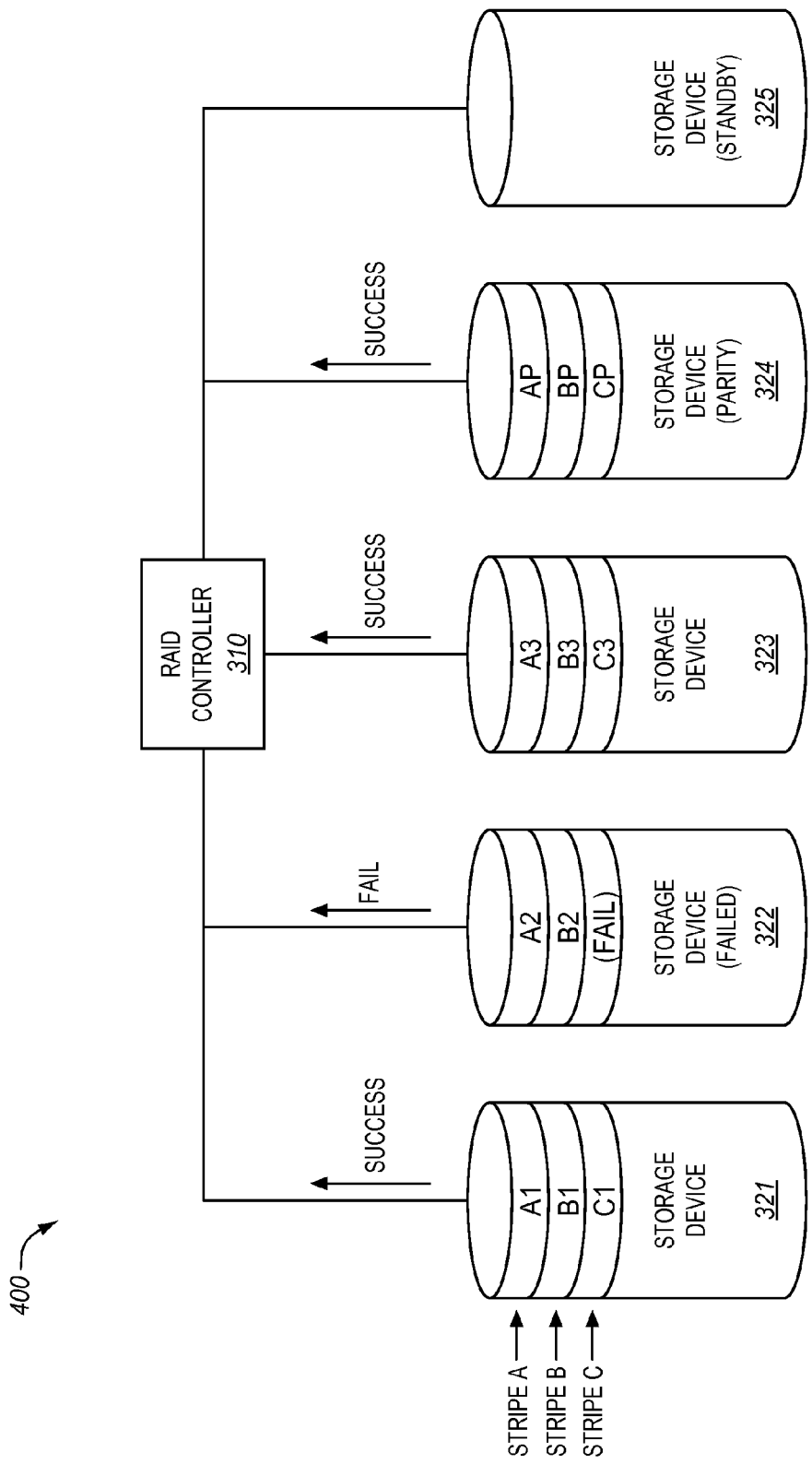
Figure 5:
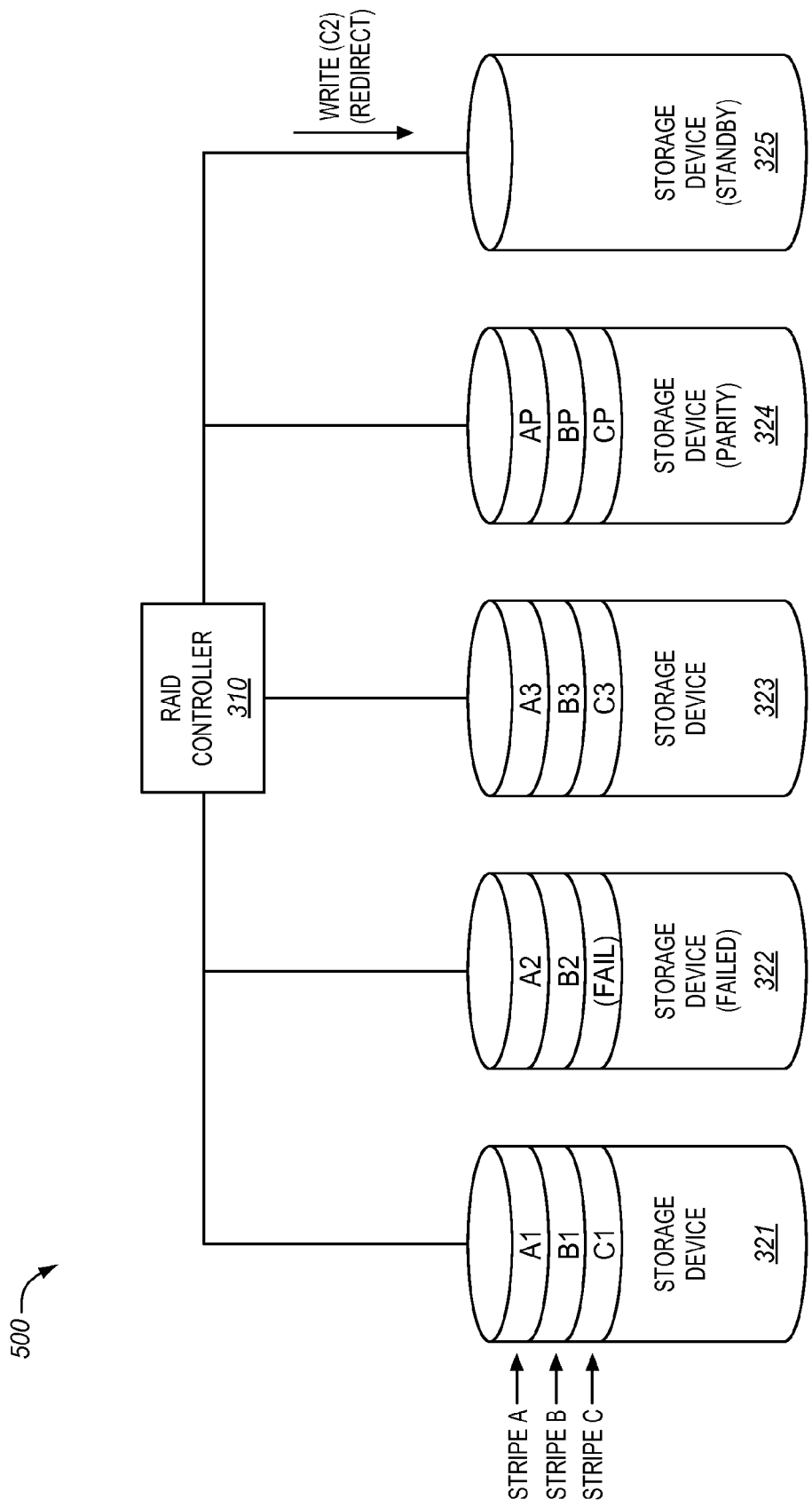
Figure 6:
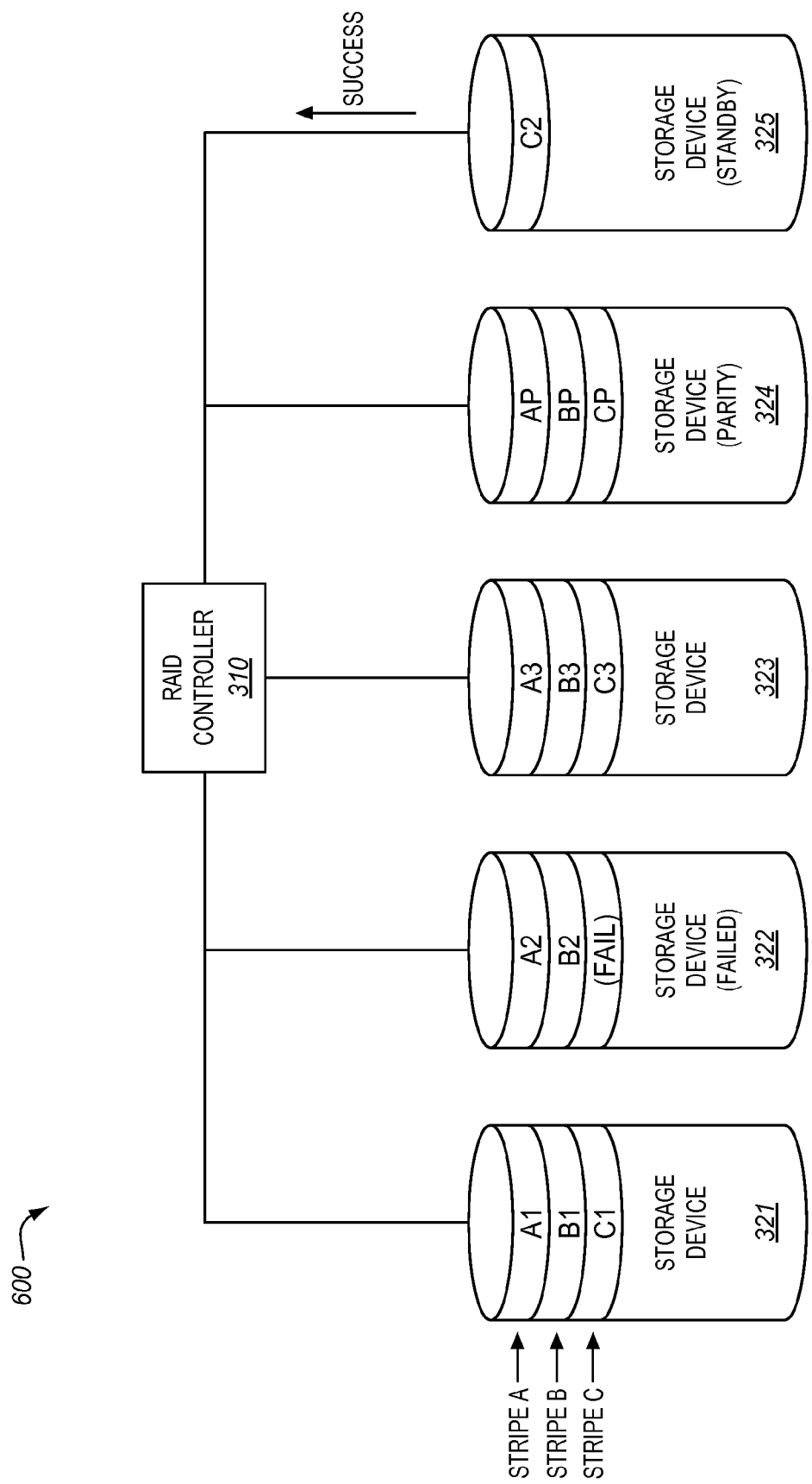

FIGS. 3-7 are block diagrams illustrating an exemplary series of operations for enhancing rebuild processes in a storage system. In this example, the storage system includes RAID controller 310, which operates as a SAS initiator and is coupled via an intervening SAS expander (not shown) to SAS/SATA storage devices 321-325. In particular, FIG. 3 is a block diagram 300 illustrating a host write request applied to RAID controller 310. The host write request indicates that LBAs corresponding to a stripe of RAID data (stripe C) should be written to the RAID 4 volume, which is provisioned by storage devices 321-324 (storage device 325 operates as a "hot spare").

RAID controller 310 receives the host write request, and consults an internally stored mapping table, correlating each requested LBA with physical addresses maintained across storage devices 321-324. Then, RAID controller 310 generates commands (e.g., commands for SAS, SATA, Peripheral Component Interconnect (PCI), etc.) for writing to the appropriate physical addresses on the storage devices, and transmits the commands to the storage devices in order to write stripe C. One of the write commands (in this case, the one directed to storage device 324) is a command to write parity data for stripe C. These commands can vary depending on the communication protocol used. For example, in SCSI and/or SAS, a SCSI_WRITE can be used, while in ATA, a WRITE_DMA or WRITE_DMA_EXT can be used.

As the individual SAS commands are received at the storage devices, the storage devices write data for stripe C into memory and report their completion status. However, storage device 322 encounters a failure while attempting to write the data for its portion (i.e., strip) of stripe C, and therefore reports a failure to RAID controller 310 as shown in block diagram 400 of FIG. 4. This failure can be reported with an error status. For example, in SCSI, a sense code, an additional sense and a code qualifier will be used to indicate the nature of the failure. When RAID controller 310 detects the failure, it determines that storage device 322 should be rebuilt. However, instead of immediately performing a rebuild (which would require parity data to be used in order to rebuild the lost data for stripe C), RAID controller 310 updates mapping table information to re-map the LBAs for the failed write to storage device 325. Once/after the mapping table has been updated to link the LBAs to physical addresses on storage device 325, RAID controller 310 redirects/reapplies the failed write from storage device 322 to storage device 325 as shown in block diagram 500 of FIG. 5. The redirected write is updated to indicate the appropriate physical addresses on storage device 325. Storage device 325 reports successful completion of the write, as shown in block diagram 600 of FIG. 6.

A mapping table stored at RAID controller 310 ensures that data for failed writes is correctly mapped to storage device 325. In this manner, the actual rebuild process for a drive can be deferred and data from failed write requests can remain available on storage device 325. Access to this data is handled by firmware at RAID controller 310, which routes incoming requests appropriately. When there are too many failures for a storage device (e.g., more than a certain number of write failures, or more than a certain amount of space occupied on spare storage device 325 by redirected writes from the storage device) such as storage device 322, the rebuild is initiated for that storage device. If a new drive (not shown) is used to replace the failed storage device, the rebuild process includes copying the redirected data from storage device 325 onto the new storage device.

As discussed herein, the FIGS. focus upon a rebuild process where storage device 325 replaces storage device 322. However, in other embodiments, an entirely new storage device may be used for the rebuild process while storage device 325 remains available to store data for newly detected write failures.

In traditional RAID rebuild processes, when a strip of a stripe has not been successfully written to a storage device, other strips of the stripe are analyzed with XOR operations in order to regenerate the lost information. However, in this embodiment, storage device 322 is capable of performing a "self-characterized copy." This feature of storage device 322 allows data to be read from storage device 322, even though storage device 322 is unavailable to complete writes. Thus, RAID controller 310 continues to generate and transmit read requests for stripes A and B to storage device 322 as necessary, while engaging in the rebuild process at storage device 325, as shown in block diagram 700 of FIG. 7.

Figure 7:
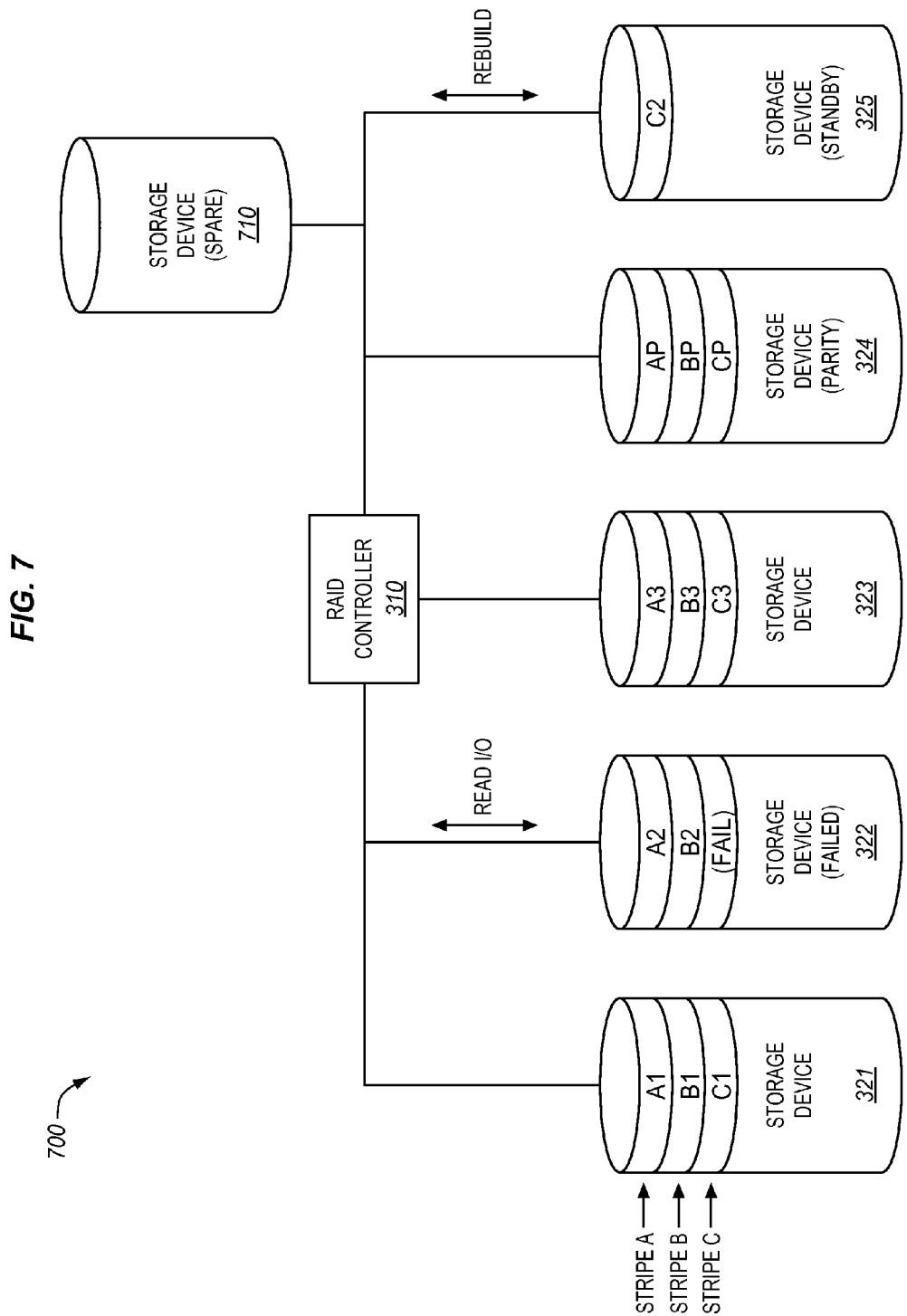

Since storage device 322 is capable of engaging in a self-characterized copy, remaining LBAs for storage device 322 (i.e., those LBAs that were not re-mapped when the write request was redirected) are copied to storage device 325 and remapped. Thus, in this example, the rebuild process for storage device 322 avoids the use of any processing intensive exclusive OR operations. The LBAs for the failed write request are remapped to storage device 325 and filled with data from the redirected write request. Meanwhile, other LBAs from storage device 322 are remapped to storage device 325 and their data is copied over to storage device 325. As an additional benefit, since the volume write request from the host was successfully completed, the RAID volume maintains a level of redundancy for stripe C throughout the entire process, enhancing overall data integrity for the RAID volume. FIG. 7 further illustrates an alternative, spare storage device 710 upon which a rebuild may be performed.

Figure 8:
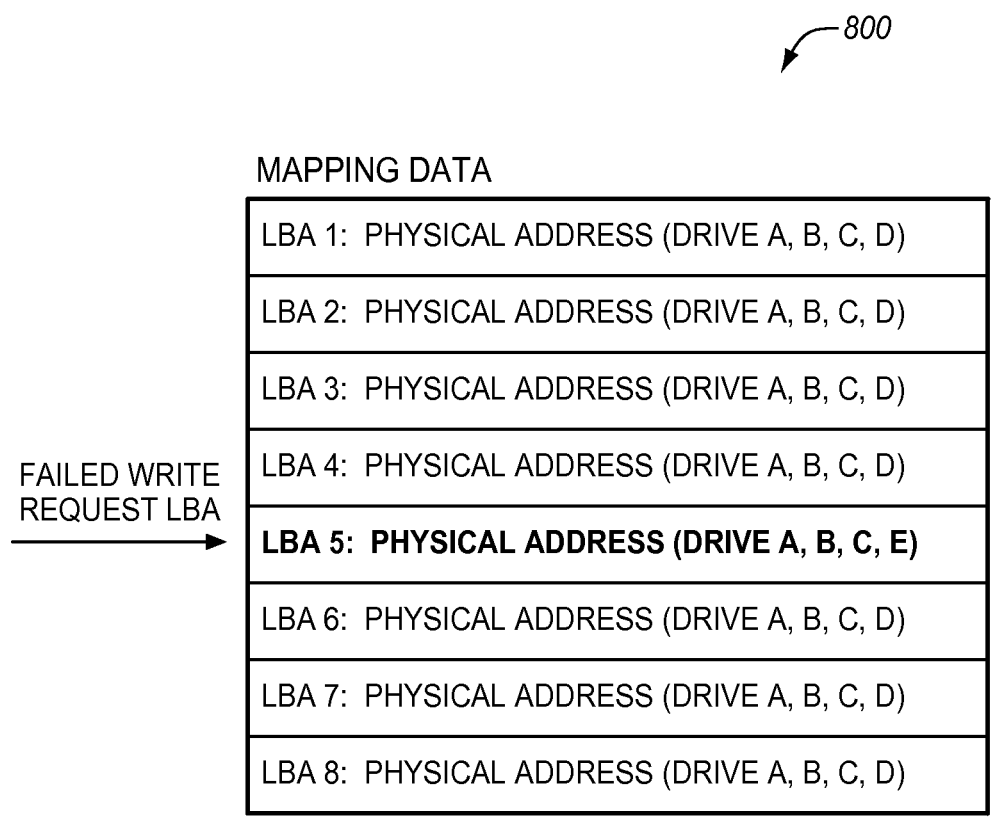
FIG. 8 is a block diagram illustrating an exemplary mapping table that has been altered to redirect a write request to a spare storage device.

FIG. 8 is a block diagram 800 illustrating an exemplary mapping table that has been altered to redirect a write request to a spare storage device. In FIG. 8, disk drives A, B, C, and D implement a RAID 5 volume for a RAID controller, while drive E acts as a spare drive. Assume, for FIG. 8, that the RAID controller has sent out write commands for LBA 5 to drives A-D, but the drive D was unable to complete the command To address this problem, the RAID controller updates the entry for LBA 5 (in bold), in order to remap the portion of the LBA stored at drive D to drive E.

Figure 9:
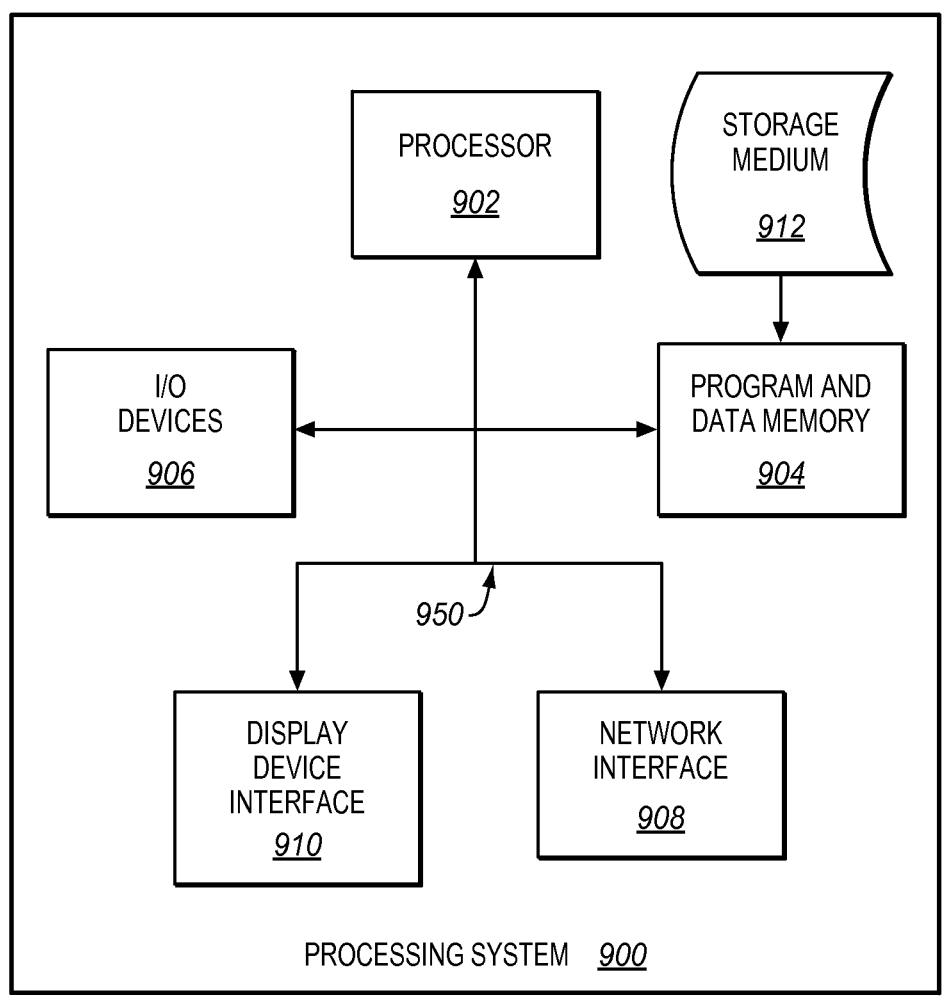
FIG. 9 illustrates an exemplary processing system operable to execute programmed instructions embodied on a computer readable medium.

Embodiments disclosed herein can take the form of software, hardware, firmware, or various combinations thereof In one particular embodiment, software is used to direct a processing system of control unit 122 to perform the various operations disclosed herein. FIG. 9 illustrates an exemplary processing system 900 operable to execute a computer readable medium embodying programmed instructions. Processing system 900 is operable to perform the above operations by executing programmed instructions tangibly embodied on computer readable storage medium 912. In this regard, embodiments of the invention can take the form of a computer program accessible via computer readable medium 912 providing program code for use by a computer (e.g., processing system 900) or any other instruction execution system. For the purposes of this description, computer readable storage medium 912 can be anything that can contain or store the program for use by the computer (e.g., processing system 900).

Computer readable storage medium 912 can be an electronic, magnetic, optical, electromagnetic, infrared, or semiconductor device. Examples of computer readable storage medium 912 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 900, being suitable for storing and/or executing the program code, includes at least one processor 902 coupled to program and data memory 904 through a system bus 950. Program and data memory 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 (including but not limited to keyboards, displays, pointing devices, etc.) can be coupled either directly or through intervening I/O controllers. Network adapter interfaces 908 can also be integrated with the system to enable processing system 900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 910 can be integrated with the system to interface to one or more display devices, such as printing systems and screens for presentation of data generated by processor 902.

What is claimed is:

1. A Redundant Array of Independent Disks (RAID) controller comprising:
a memory operable to store mapping information that correlates Logical Block Addresses of a Redundant Array of Independent Disks volume with physical addresses of storage devices; and
at least one processor operable to generate a request to write volume data to at least one of the physical addresses, to determine that a storage device has failed to complete the request, to alter the mapping information by correlating Logical Block Addresses for the request with physical addresses of a spare storage device, to redirect the request to the spare storage device based on the altered mapping information, and to rebuild remaining Logical Block Addresses that are correlated with the storage device that failed, the remaining Logical Block Addresses excluding Logical Block Addresses associated with the request.

2. The RAID controller of claim 1, wherein:
the at least one processor is further operable to rebuild the remaining Logical Block Addresses onto the spare storage device, and to update the mapping information by correlating the remaining Logical Block Addresses with physical addresses of the spare storage device.

3. The RAID controller of claim 1, wherein:
the at least one processor is further operable to rebuild the remaining Logical Block Addresses by performing exclusive OR operations based on parity data within each stripe of volume data.

4. The RAID controller of claim 1, wherein:
the at least one processor is further operable to generate read requests directed to the storage device that failed, while rebuilding the remaining Logical Block Addresses of the storage device that failed.

5. The RAID controller of claim 1, wherein:
the at least one processor is further operable to detect that the storage device that failed has been physically removed and replaced with a new storage device, and to rebuild the remaining Logical Block Addresses onto the new storage device.

6. The RAID controller of claim 1, wherein:
the storage devices are compliant with at least one of Serial Attached Small Computer System Interface protocol and Serial Advanced Technology Attachment protocol.

7. The RAID controller of claim 1, wherein:
the at least one processor is further operable to redirect multiple write requests for multiple failed storage devices to the spare storage device.

8. A method for operating a Redundant Array of Independent Disks (RAID) controller, wherein the controller includes a memory storing mapping information that correlates Logical Block Addresses of a Redundant Array of Independent Disks volume with physical addresses of storage devices, the method comprising:
generating a request to write volume data to at least one of the physical addresses;
determining that a storage device has failed to complete the request;
altering the mapping information by correlating Logical Block Addresses for the request with physical addresses of a spare storage device;
redirecting the request to the spare storage device based on the altered mapping information; and
rebuilding remaining Logical Block Addresses that are correlated with the storage device that failed without rebuilding Logical Block Addresses associated with the request.

9. The method of claim 8, further comprising:
rebuilding the remaining Logical Block Addresses onto the spare storage device; and
updating the mapping information by correlating the remaining Logical Block Addresses with physical addresses of the spare storage device.

10. The method of claim 8, further comprising:
rebuilding the remaining Logical Block Addresses by performing exclusive OR operations based on parity data within each stripe of volume data.

11. The method of claim 8, further comprising:
generating read requests directed to the storage device that failed, while rebuilding the remaining Logical Block Addresses of the storage device that failed.

12. The method of claim 8, further comprising:
detecting that the storage device that failed has been physically removed and replaced with a new storage device; and rebuilding the remaining Logical Block Addresses onto the new storage device.

13. The method of claim 8, wherein:

the storage devices are compliant with a protocol selected from the group consisting of Serial Attached Small Computer System Interface and Serial Advanced Technology Attachment.

14. The method of claim 8, further comprising:

redirecting multiple write requests for multiple failed storage devices to the spare storage device.

15. A storage controller comprising:

means for storing mapping information that correlates Logical Block Addresses of a Redundant Array of Independent Disks volume with physical addresses of storage devices; and means for generating a request to write volume data to at least one of the physical addresses, determining that a storage device has failed to complete the request, altering the mapping information by correlating Logical Block Addresses for the request with physical addresses of a spare storage device, redirecting the request to the spare storage device based on the altered mapping information, and rebuilding remaining Logical Block Addresses that are correlated with the storage device that failed, the remaining Logical Block Addresses excluding Logical Block Addresses associated with the request.

16. The storage controller of claim 15, further comprising:

means for rebuilding the remaining Logical Block Addresses onto the spare storage device, and updating the mapping information by correlating the remaining Logical Block Addresses with physical addresses of the spare storage device.

17. The storage controller of claim 15, further comprising:

means for rebuilding the remaining Logical Block Addresses by performing exclusive OR operations based on parity data within each stripe of volume data.

18. The storage controller of claim 15, further comprising:

means for generating read requests directed to the storage device that failed, while rebuilding the remaining Logical Block Addresses of the storage device that failed.

19. The storage controller of claim 15, further comprising:

means for detecting that the storage device that failed has been physically removed and replaced with a new storage device, and rebuilding the remaining Logical Block Addresses onto the new storage device.

20. The storage controller of claim 15, wherein:

the storage devices are compliant with a protocol selected from the group consisting of Serial Attached Small Computer System Interface and Serial Advanced Technology Attachment.

* * * * *